United States Patent
Kolahdouzan et al.

(10) Patent No.: US 11,941,904 B2
(45) Date of Patent: Mar. 26, 2024

(54) COMPUTER-IMPLEMENTED METHOD FOR EXTRACTING CONTENT FROM A PHYSICAL WRITING SURFACE

(71) Applicant: INKERZ PTY LTD, Sydney (AU)

(72) Inventors: Vahid Kolahdouzan, North Sydney (AU); Abdolhossein Aminaiee, North Sydney (AU); Masoud Kolahdouzan, Las Vegas, NV (US)

(73) Assignee: INKERZ PTY LTD, Sydney (AU)

( * ) Notice: Subject to any disclaimer, the term of this patent is extended or adjusted under 35 U.S.C. 154(b) by 0 days.

(21) Appl. No.: 17/662,480

(22) Filed: May 9, 2022

(65) Prior Publication Data

US 2022/0262149 A1 Aug. 18, 2022

Related U.S. Application Data

(63) Continuation-in-part of application No. PCT/AU2020/051227, filed on Nov. 11, 2020.

(51) Int. Cl.
*G06V 30/414* (2022.01)
*G06V 30/14* (2022.01)
(Continued)

(52) U.S. Cl.
CPC ........ *G06V 30/414* (2022.01); *G06V 30/1444* (2022.01); *G06V 30/1463* (2022.01);
(Continued)

(58) Field of Classification Search
CPC .... G06V 30/10; G06V 30/155; G06V 30/413; G06V 30/414; G06V 30/1444;
(Continued)

(56) References Cited

U.S. PATENT DOCUMENTS

2011/0025860 A1* 2/2011 Katougi ................ G06T 3/4069
358/3.26
2016/0352979 A1 12/2016 Ilic
(Continued)

OTHER PUBLICATIONS

Computer English Translation of Japanese Patent No. JP2008033189A , pp. 1-32. (Year: 2008).*
(Continued)

*Primary Examiner* — Daniel G Mariam
(74) *Attorney, Agent, or Firm* — FisherBroyles, LLP; Ian R. Walsworth

(57) ABSTRACT

A computer-implemented method (300) for extracting content (302) from a physical writing surface (304), the method (300) comprising the steps of:
(a) receiving a reference frame (306) including image data relating to at least a portion of the physical writing surface (304), the image data including a set of data points;
(b) determining an extraction region (308), the extraction region (308) including a subset of the set of data points from which content (302) is to be extracted;
(c) extracting content (302) from the extraction region (308) and writing the content (302) to a display frame (394);
(d) receiving a subsequent frame (406) including subsequent image data relating to at least a portion of the physical writing surface (304), the subsequent image data including a subsequent set of data points;
(e) determining a subsequent extraction region (408), the subsequent extraction region (408) including a subset of the subsequent set of data points from which content (402) is to be extracted; and
(f) extracting subsequent content (402) from the subsequent extraction region (408) and writing the subsequent content (402) to the display frame (394).

19 Claims, 11 Drawing Sheets

(51) Int. Cl.
*G06V 30/146* (2022.01)
*G06V 30/148* (2022.01)
*G06V 30/18* (2022.01)
*G06V 30/413* (2022.01)
*G06V 30/10* (2022.01)

(52) U.S. Cl.
CPC ........ *G06V 30/1475* (2022.01); *G06V 30/155* (2022.01); *G06V 30/1801* (2022.01); *G06V 30/413* (2022.01); *G06V 30/10* (2022.01)

(58) Field of Classification Search
CPC ........... G06V 30/1463; G06V 30/1475; G06V 30/1801; G06T 2207/20164; G06F 3/04883; G06F 3/1454; G09B 5/00; H04L 12/1813

See application file for complete search history.

(56) References Cited

U.S. PATENT DOCUMENTS

| | | | |
|---|---|---|---|
| 2017/0185843 A1* | 6/2017 | Goto | G06T 7/74 |
| 2019/0034459 A1 | 1/2019 | Qiu | |
| 2019/0037099 A1 | 1/2019 | Thomas et al. | |
| 2019/0171876 A1 | 6/2019 | Segalovitz et al. | |
| 2019/0180445 A1 | 6/2019 | Aggarwal et al. | |

OTHER PUBLICATIONS

International Search Report associated with parent PCT/AU2020/051227, dated May 20, 2021.
Written Opinion associate with parent PCT/AU2020/051227, dated May 20, 2021.

\* cited by examiner

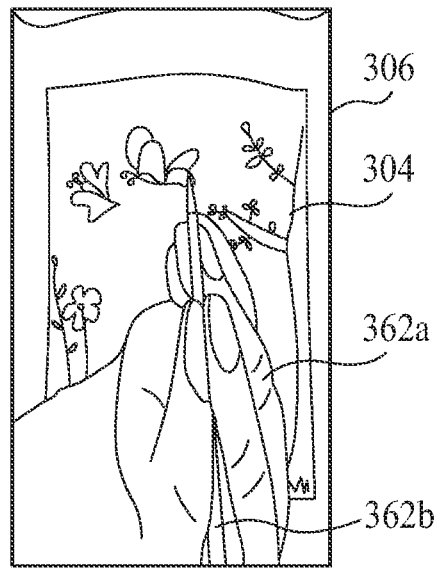
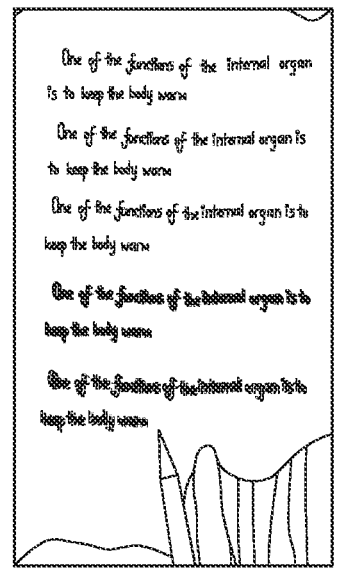
Fig. 9A
Fig. 10A
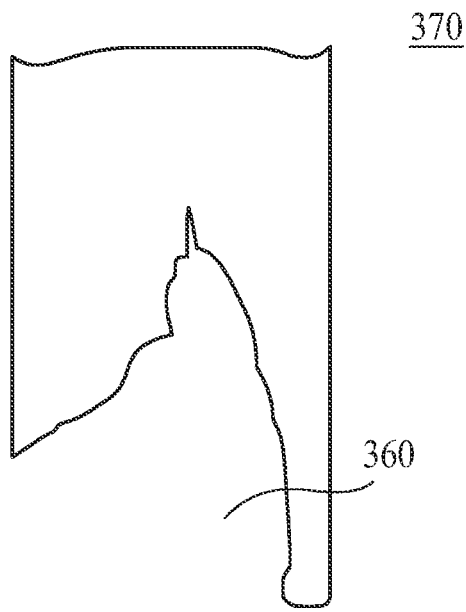
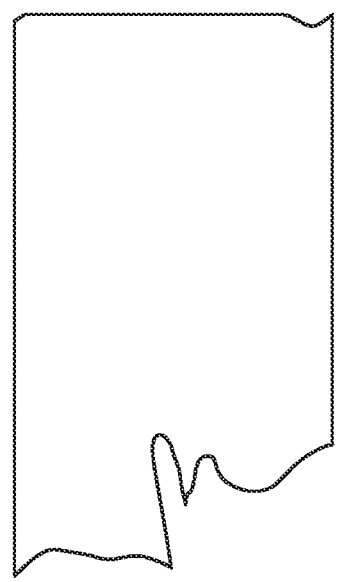
Fig. 9B
Fig. 10B

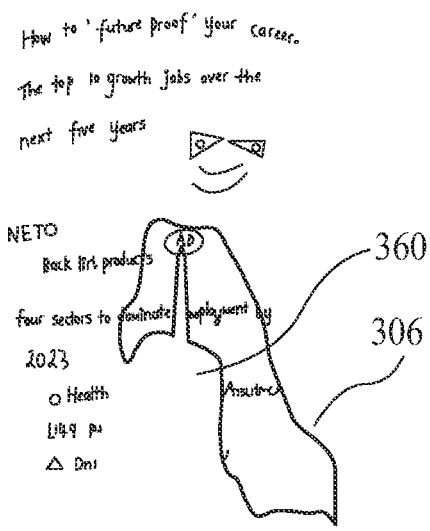
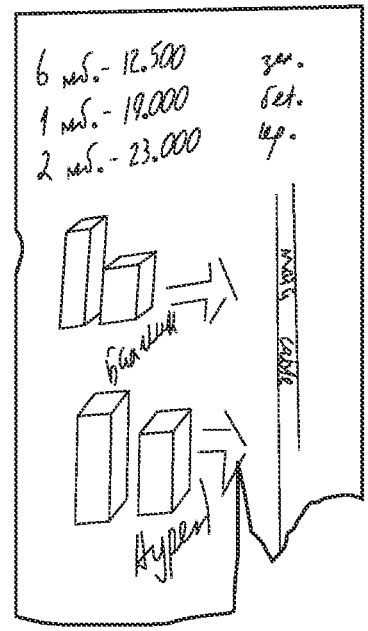
Fig. 11A　　　　　　　Fig. 12A
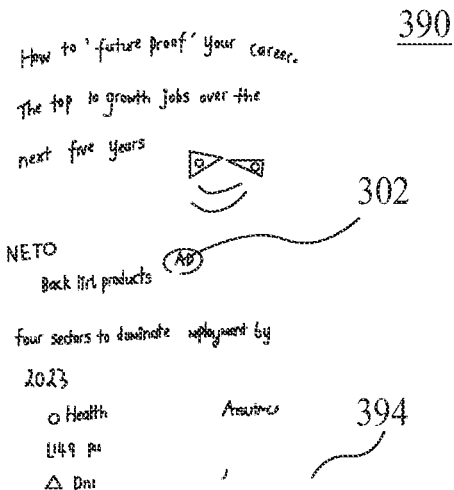
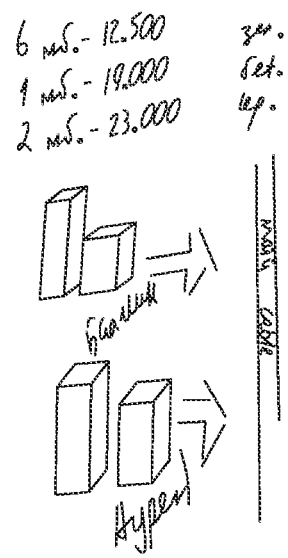
Fig. 11B　　　　　　　Fig. 12B

COMPUTER-IMPLEMENTED METHOD FOR EXTRACTING CONTENT FROM A PHYSICAL WRITING SURFACE

RELATED APPLICATION

This application is a continuation-and-part of PCT Application No. PCT/AU2020/051227, filed Nov. 11, 2020, which claims the benefit of priority from Australian Provisional Patent Application No. 2019904249, filed Nov. 11, 2019, the entire disclosures of which are incorporated by reference herein.

FIELD

The present invention relates to a computer-implemented method for extracting content from a physical writing surface.

BACKGROUND

Existing internet collaboration platforms (and in particular those in the education industry) do not allow for efficient use of conventional pen and paper when it comes to collaborating with other users of the system.

Existing web-conferencing applications (such as WebEx, Adobe Connect etc.) are tools that are not specifically designed to replicate a face-to-face environment.

Existing writing detection systems in general are specialised systems that rely on Infra-Red, Ultrasound, or active pens to detect writing movement.

SUMMARY OF INVENTION

It is an object of the present invention to address one or more of the above disadvantages, or at least provide a useful alternative to the above-mentioned writing detection systems.

In a first aspect, the present invention provides a computer-implemented method for extracting content from a physical writing surface, the method comprising the steps of:
  (a) receiving a reference frame including image data relating to at least a portion of the physical writing surface, the image data including a set of data points;
  (b) determining an extraction region, the extraction region including a subset of the set of data points from which content is to be extracted;
  (c) extracting content from the extraction region and writing the content to a display frame;
  (d) receiving a subsequent frame including subsequent image data relating to at least a portion of the physical writing surface, the subsequent image data including a subsequent set of data points;
  (e) determining a subsequent extraction region, the subsequent extraction region including a subset of the subsequent set of data points from which content is to be extracted; and
  (f) extracting subsequent content from the subsequent extraction region and writing the subsequent content to the display frame.

Preferably, the method further includes the steps of:
  (b1) determining a corner location of two or more corners of the extraction region;
  (e1) determining a subsequent corner location of two or more corners of the subsequent extraction region.

Preferably, the corner location of the two or more corners are determined by:
  (b1i) determining two or more edges of the extraction region;
  (b1ii) determining two or more locations at which two edges intersect, thereby determining the corner locations, and the two or more subsequent corner locations are determined by:
  (e1i) determining two or more edges of the subsequent extraction region;
  (e1ii) determining two or more locations at which two edges intersect, thereby determining the subsequent corner locations.

Preferably, steps (d) to (f) are repeated for a period of time for a series of subsequent frames, and wherein the method further includes the step of:
  (e2) determining a stabilized subsequent corner location by applying a Kalman filter to the subsequent corner locations of at least one of the subsequent corners in the series of subsequent frames and overwriting the subsequent corner location with the respective stabilized corner location.

Preferably, the method further includes the steps of:
  (b3) transforming the extraction region such that the corners of the extraction region are congruent with a normal projection of the physical writing surface; and
  (e3) transforming the subsequent extraction region such that the corners of the subsequent extraction region are congruent with the normal projection.

Preferably, the method further includes the steps of:
  (b4) determining an object region within the extraction region, the object region including a subset of the set of data points which do not relate to content to be extracted;
  (b5) removing the subset of data points in the object region from the subset of data points in the extraction region;
  (e4) determining a subsequent object region within the subsequent extraction region, the subsequent object region including a subset of the subsequent subset of data points which do not relate to content to be extracted; and
  (e5) removing the subsequent subset of data points in the object region from the subsequent subset of data points in the extraction region.

Preferably, the method further includes the steps of:
  (c1) during the step of extracting the content, altering the image data to remove the effects of one or more of:
  shadows on the physical writing surface;
  reflections on the physical writing surface; or
  lack of sharpness of the content; and
  (f1) during the step of extracting the subsequent content, altering the subsequent image data to remove the effects of one or more of:
  shadows on the physical writing surface;
  reflections on the physical writing surface; or
  lack of sharpness of the subsequent content.

Preferably, the method further includes the step of:
  (f2) aligning the subsequent content with the content prior to writing the subsequent content to the display frame.

Preferably, steps (e) to (f) are repeated for a period of time for a series of subsequent frames, and wherein the method further including the steps of:
  (f3) aligning the subsequent content with the content using an alignment vector determined by a registration algorithm;

(g1) storing the alignment vector associated with each subsequent frame in the series of subsequent frames to form a series of alignment vectors;

(g2) comparing the alignment vectors in the series of alignment vectors and determining whether a component of the alignment vectors is substantially similar in magnitude in the series of alignment vectors; and (g3) if the component is substantially similar in magnitude in the series of alignment vectors, transform the display frame by an inverse of the component.

Preferably, the method is also suitable for extracting content from a further physical writing surface and write the content to a further display frame, the method further including the steps of:

(f4) determining if the alignment vector fails to be determined and/or fails a quality control;

(f5) determining a further alignment vector using the registration algorithm to align the subsequent content with the content written to the further display frame; and (f6) if the further alignment vector is determined and/or passes the quality control, writing the subsequent content to the further display frame.

Preferably, the method further includes the step of:

(f7) displaying the further display frame on a display.

Preferably, steps (e) to (f) are repeated for a period of time for a series of subsequent frames, and wherein the method further includes the step of:

(f8) removing the subsequent content associated with an earlier subsequent frame in the series of subsequent frames from the display frame.

Preferably, dependent from claim 5, wherein the subsequent content from an earlier subsequent frame to be removed in step (f3) only relates to the subsequent content that is not located in the subsequent object region of the most recent frame in the series of subsequent frames.

Preferably, the method further includes the steps of:

(b1) determining a plurality of candidate extraction regions, each candidate extraction region including a subset of the set of data points from which content is to be extracted; and (b2) selecting the largest candidate extraction region of the plurality of candidate extraction regions as the extraction region.

Preferably, the method further includes the step of:

(f9) displaying the display frame on a display, or projecting the display frame onto a second physical writing surface.

Preferably, the method is performed in alphabetical and/or numerical order of the steps as numbered.

In a second aspect, the present invention provides a non-transient computer-readable medium containing executable instructions for configuring a processor of a processing system to extract content from a physical writing surface, wherein execution of the executable instructions by the processor configures the processor to perform the steps of the method of the first aspect.

In a third aspect, the present invention provides one or more servers performing the method of the first aspect.

In a fourth aspect, the present invention provides a system for extracting content from a physical writing surface, the system including:

an electronic device; and the one or more servers of the third aspect.

BRIEF DESCRIPTION OF DRAWINGS

Preferred embodiments of the present invention will now be described, by way of examples only, with reference to the accompanying drawings.

Figure 3:
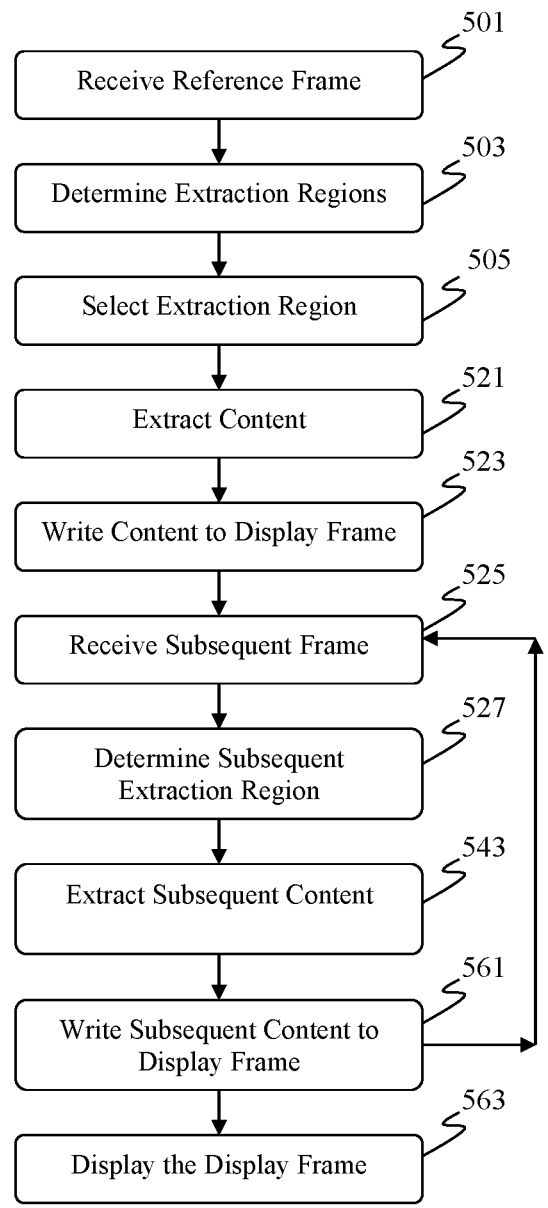
FIG. 3 is a schematic diagram of a preferred embodiment of the computer-implemented method of the present invention.

9A and 9B are sample training images for an object region neural network used in the method of FIG. 3.

10A and 10B are sample training images for an object region neural network used in the method of FIG. 3.

11A and 11B are sample training images for a content neural network used in the method of FIG. 3.

12A and 12B are sample training images for a content neural network used in the method of FIG. 3.

DESCRIPTION OF EMBODIMENTS

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and that above relating to prior art arrangements relate to discussions of documents or devices which form public knowledge through their respective publication and/or use. Such should not be interpreted as a representation by the present inventor(s) or the patent applicant that such documents or devices in any way form part of the common general knowledge in the art.

When describing steps of a method, it assists in conveying the preferred embodiment to portray the steps in the disclosed order. However, it will be understood by the person skilled in the art that the steps could be performed in a different order, provided the flow information permits the rearrangement. Similarly, any labelling of steps in claims appended to this description will be understood to not limit the claim to the particularly labelled order.

Figure 1A:
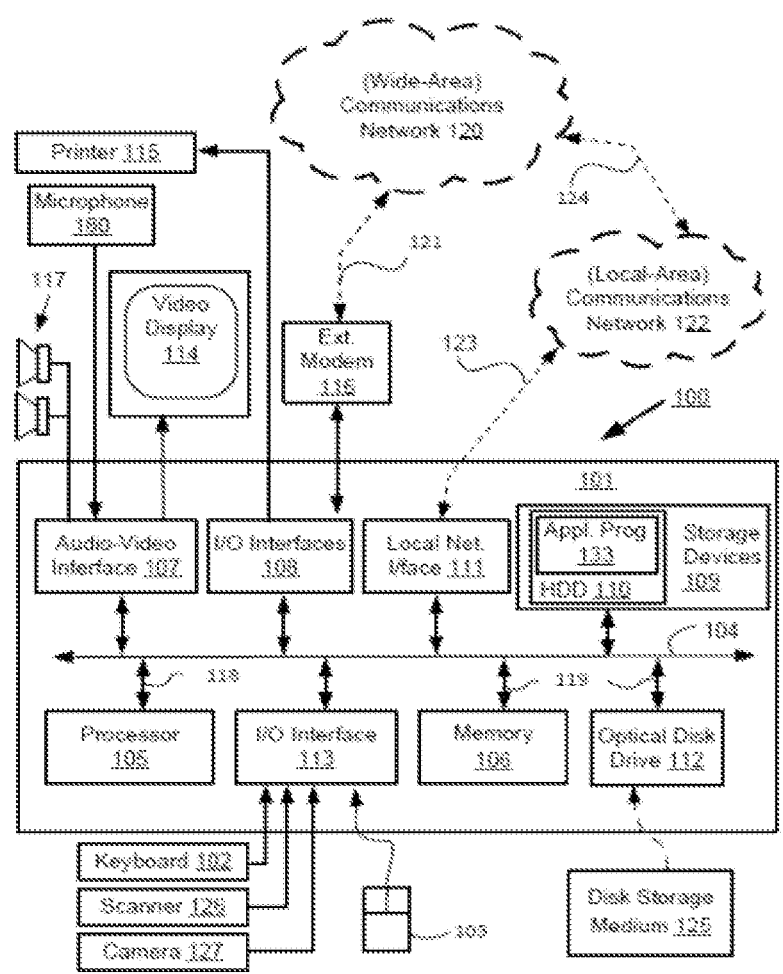
FIGS. 1A and 1B depict a general-purpose computer system 100, upon which a preferred embodiment of the method according to the present invention may be implemented.
Figure 1B:
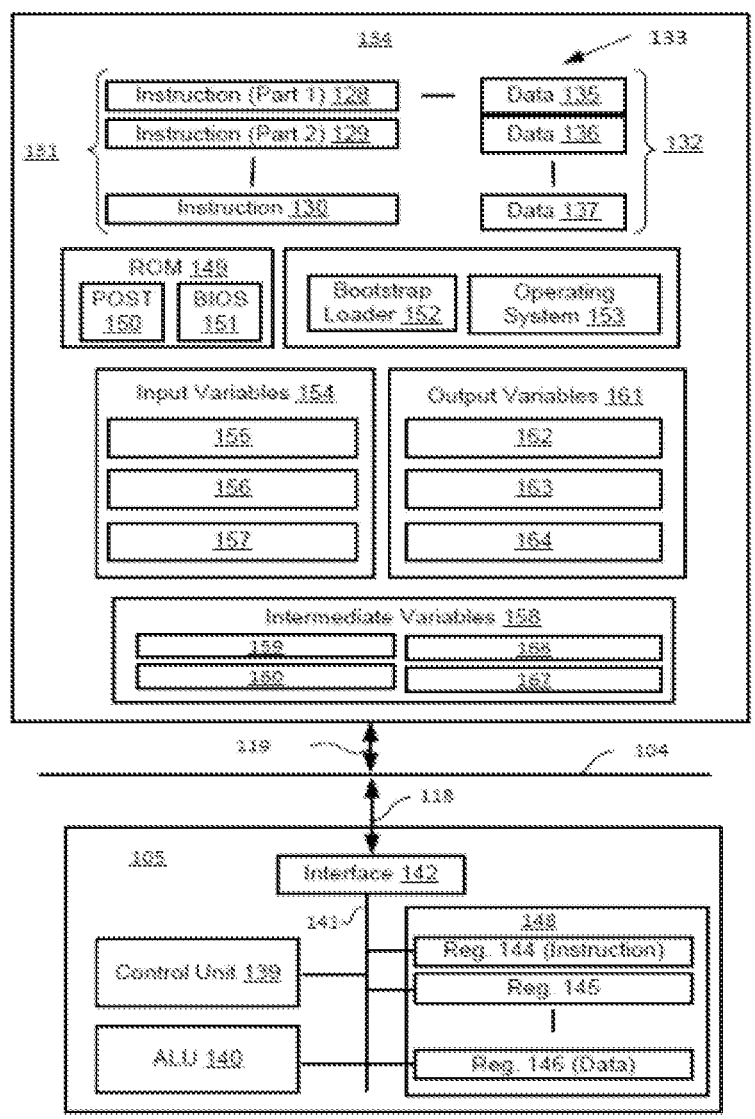

FIGS. 1A and 1B depict a general-purpose computer system 100, upon which the various arrangements described can be practiced.

As seen in FIG. 1A, the computer system 100 includes: a computer module 101; input devices such as a keyboard 102, a mouse pointer device 103, a scanner 126, a camera 127, and a microphone 180; and output devices including a printer 115, a display device 114 and loudspeakers 117. An external Modulator-Demodulator (Modem) transceiver device 116 may be used by the computer module 101 for communicating to and from a communications network 120 via a connection 121. The communications network 120 may be a wide-area network (WAN), such as the Internet, a cellular telecommunications network, or a private WAN. Where the connection 121 is a telephone line, the modem 116 may be a traditional "dial-up" modem. Alternatively, where the connection 121 is a high capacity (e.g., cable) connection, the modem 116 may be a broadband modem. A wireless modem may also be used for wireless connection to the communications network 120.

The computer module 101 typically includes at least one processor unit 105, and a memory unit 106. For example, the memory unit 106 may have semiconductor random access memory (RAM) and semiconductor read only memory (ROM). The computer module 101 also includes a number of input/output (I/O) interfaces including: an audio-video interface 107 that couples to the video display 114, loudspeakers 117 and microphone 180; an I/O interface 113 that couples to the keyboard 102, mouse 103, scanner 126, camera 127 and optionally a joystick or other human interface device (not illustrated), or a projector; and an interface 108 for the external modem 116 and printer 115. In some implementations, the modem 116 may be incorporated within the computer module 101, for example within the interface 108. The computer module 101 also has a local network interface 111, which permits coupling of the computer system 100 via a connection 123 to a local-area communications network 122, known as a Local Area Network (LAN). As illustrated in FIG. 1A, the local communications network 122 may also couple to the wide network 120 via a connection 124, which would typically include a so-called "firewall" device or device of similar functionality. The local network interface 111 may comprise an Ethernet circuit card, a Bluetooth® wireless arrangement or an IEEE 802.11 wireless arrangement; however, numerous other types of interfaces may be practiced for the interface 111.

The I/O interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (e.g., CD-ROM, DVD, Blu ray Disc™), USB-RAM, portable, external hard drives, and floppy disks, for example, may be used as appropriate sources of data to the system 100.

The components 105 to 113 of the computer module 101 typically communicate via an interconnected bus 104 and in a manner that results in a conventional mode of operation of the computer system 100 known to those in the relevant art. For example, the processor 105 is coupled to the system bus 104 using a connection 118. Likewise, the memory 106 and optical disk drive 112 are coupled to the system bus 104 by connections 119. Examples of computers on which the described arrangements can be practised include IBM-PC's and compatibles, Sun Sparcstations, Apple Mac' or a like computer system.

Figure 4:
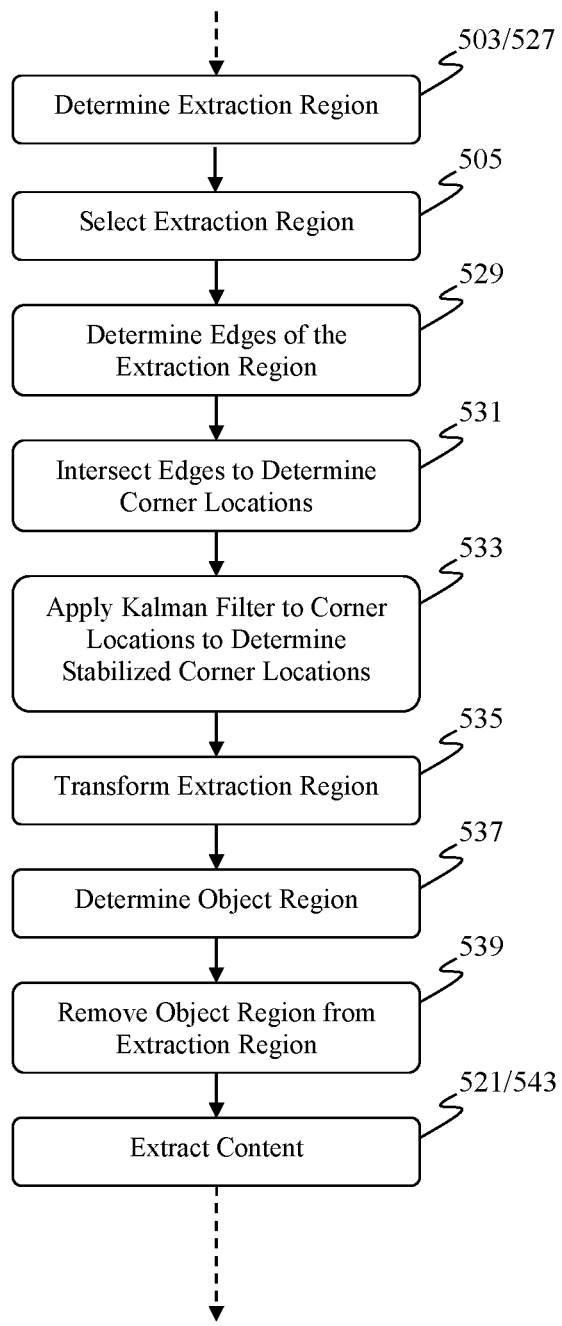
FIG. 4 is a schematic detailed diagram of the method of FIG. 3.
Figure 5:
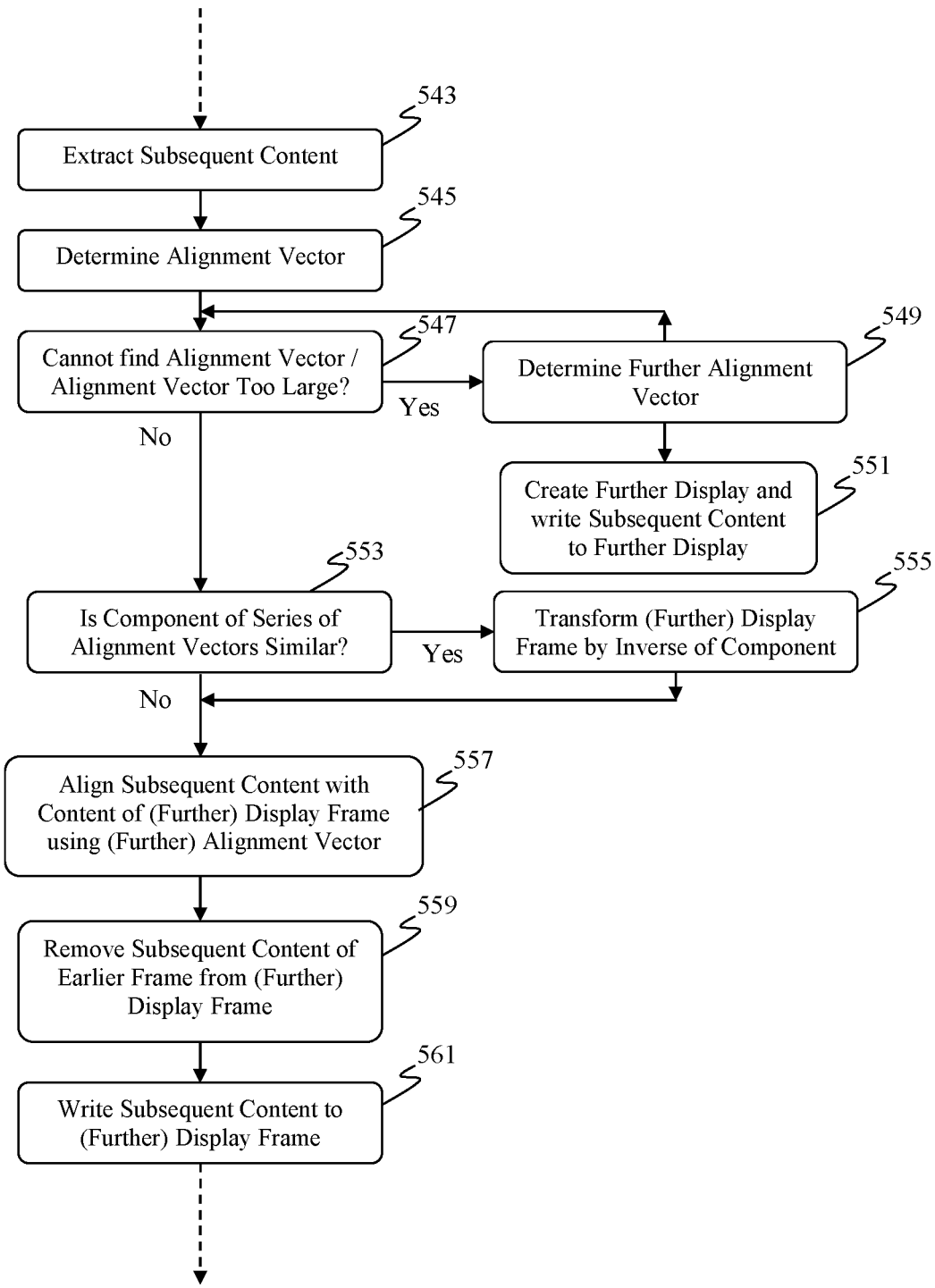
FIG. 5 is a schematic detailed diagram of the method of FIG. 3
Figure 7A:
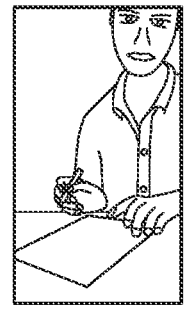
FIGS. 7A to 7C are sample training images for an extraction region neural network used in the method of FIG. 3.
Figure 7B:
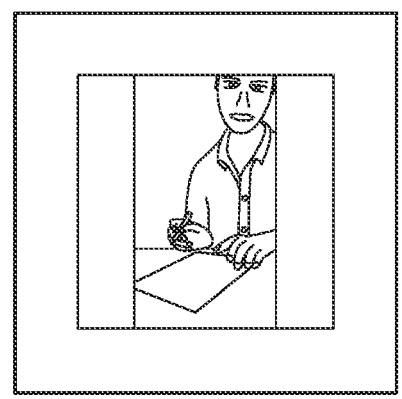

The methods as described herein may be implemented using the computer system 100 wherein the processes of FIGS. 3 to 5, to be described, may be implemented as one or more software application programs 133 executable within the computer system 100. In particular, the steps of the methods described herein are effected by instructions 131 (see FIG. 1B) in the software 133 that are carried out within the computer system 100. The software instructions 131 may be formed as one or more code modules, each for performing one or more particular tasks.

The software may be stored in a non-transient computer readable medium, including the storage devices described below, for example. The software is loaded into the computer system 100 from the computer readable medium, and then executed by the computer system 100. A computer readable medium having such software or computer program recorded on the computer readable medium is a computer program product. The use of the computer program product in the computer system 100 preferably effects an advantageous apparatus for detecting and/or sharing writing actions.

The software 133 is typically stored in the HDD 110 or the memory 106. The software is loaded into the computer system 100 from a computer readable medium, and executed by the computer system 100. Thus, for example, the software 133 may be stored on an optically readable disk storage medium (e.g., CD-ROM) 125 that is read by the optical disk drive 112. A computer readable medium having such software or computer program recorded on it is a computer program product. The use of the computer program product in the computer system 100 preferably effects the computer-implemented method for extracting content from a physical writing surface.

In some instances, the application programs 133 may be supplied to the user encoded on one or more CD-ROMs 125 and read via the corresponding drive 112, or alternatively may be read by the user from the networks 120 or 122. Still further, the software can also be loaded into the computer system 100 from other computer readable media. Computer readable storage media refers to any non-transitory tangible storage medium that provides recorded instructions and/or data to the computer system 100 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 101. Examples of transitory or non-tangible computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the application programs 133 and the corresponding code modules mentioned above may be executed to implement one or more graphical user interfaces (GUIs) to be rendered or otherwise represented upon the display 114. Through manipulation of typically the keyboard 102 and the mouse 103, a user of the computer system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via the microphone 180.

FIG. 1B is a detailed schematic block diagram of the processor 105 and a "memory" 134. The memory 134 represents a logical aggregation of all the memory modules (including the HDD 109 and semiconductor memory 106) that can be accessed by the computer module 101 in FIG. 1A.

When the computer module 101 is initially powered up, a power-on self-test (POST) program 150 executes. The POST program 150 is typically stored in a ROM 149 of the semiconductor memory 106 of FIG. 1A. A hardware device such as the ROM 149 storing software is sometimes referred to as firmware. The POST program 150 examines hardware within the computer module 101 to ensure proper functioning and typically checks the processor 105, the memory 134 (109, 106), and a basic input-output systems software (BIOS) module 151, also typically stored in the ROM 149, for correct operation. Once the POST program 150 has run successfully, the BIOS 151 activates the hard disk drive 110 of FIG. 1A. Activation of the hard disk drive 110 causes a bootstrap loader program 152 that is resident on the hard disk drive 110 to execute via the processor 105. This loads an operating system 153 into the RAM memory 106, upon which the operating system 153 commences operation. The operating system 153 is a system level application, executable by the processor 105, to fulfil various high level functions, including processor management, memory management, device management, storage management, software application interface, and generic user interface. It is now common for multiple independent operating systems to be hosted on the same processor 105 using so-called virtualization applications.

The operating system 153 manages the memory 134 (109, 106) to ensure that each process or application running on the computer module 101 has sufficient memory in which to execute without colliding with memory allocated to another process. Furthermore, the different types of memory available in the system 100 of FIG. 1A must be used properly so that each process can run effectively. Accordingly, the aggregated memory 134 is not intended to illustrate how particular segments of memory are allocated (unless otherwise stated), but rather to provide a general view of the memory accessible by the computer system 100 and how such is used.

As shown in FIG. 1B, the processor 105 includes a number of functional modules including a control unit 139, an arithmetic logic unit (ALU) 140, and a local or internal memory 148, sometimes called a cache memory. The cache memory 148 typically includes a number of storage registers 144-146 in a register section. One or more internal busses 141 functionally interconnect these functional modules. The processor 105 typically also has one or more interfaces 142 for communicating with external devices via the system bus 104, using a connection 118. The memory 134 is coupled to the bus 104 using a connection 119.

The application program 133 includes a sequence of instructions 131 that may include conditional branch and loop instructions. The program 133 may also include data 132 which is used in execution of the program 133. The instructions 131 and the data 132 are stored in memory locations 128, 129, 130 and 135, 136, 137, respectively. Depending upon the relative size of the instructions 131 and the memory locations 128-130, a particular instruction may be stored in a single memory location as depicted by the instruction shown in the memory location 130. Alternately, an instruction may be segmented into a number of parts, each of which is stored in a separate memory location, as depicted by the instruction segments shown in the memory locations 128 and 129.

In general, the processor 105 is given a set of instructions which are executed therein. The processor 105 waits for a subsequent input, to which the processor 105 reacts to by executing another set of instructions. Each input may be provided from one or more of a number of sources, including data generated by one or more of the input devices 102, 103, data received from an external source across one of the networks 120, 102, data retrieved from one of the storage devices 106, 109 or data retrieved from the storage medium 125 inserted into the corresponding reader 112, all depicted in FIG. 1A. The execution of a set of the instructions may in some cases result in output of data. Execution may also involve storing data or variables to the memory 134.

The disclosed writing detection and sharing arrangements use input variables 154, which are stored in the memory 134 in corresponding memory locations 155, 156, 157. The writing detection and sharing arrangements produce output variables 161, which are stored in the memory 134 in corresponding memory locations 162, 163, 164. Intermediate variables 158 may be stored in memory locations 159, 160, 166 and 167.

Referring to the processor 105 of FIG. 1B, the registers 144, 145, 146, the arithmetic logic unit (ALU) 140, and the control unit 139 work together to perform sequences of micro-operations needed to perform "fetch, decode, and execute" cycles for every instruction in the instruction set making up the program 133. Each fetch, decode, and execute cycle comprises:

a fetch operation, which fetches or reads an instruction 131 from a memory location 128, 129, 130;

a decode operation in which the control unit 139 determines which instruction has been fetched; and an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 162.

Each step or sub-process in the processes of FIGS. 3 to 5 is associated with one or more segments of the program 133 and is performed by the register section 144, 145, 147, the ALU 140, and the control unit 139 in the processor 105 working together to perform the fetch, decode, and execute cycles for every instruction in the instruction set for the noted segments of the program 133.

The methods described herein may alternatively be implemented in dedicated hardware such as one or more integrated circuits performing the functions or sub functions of the writing detection and sharing methods. Such dedicated hardware may include graphic processors, digital signal processors, or one or more microprocessors and associated memories.

Figure 2A:
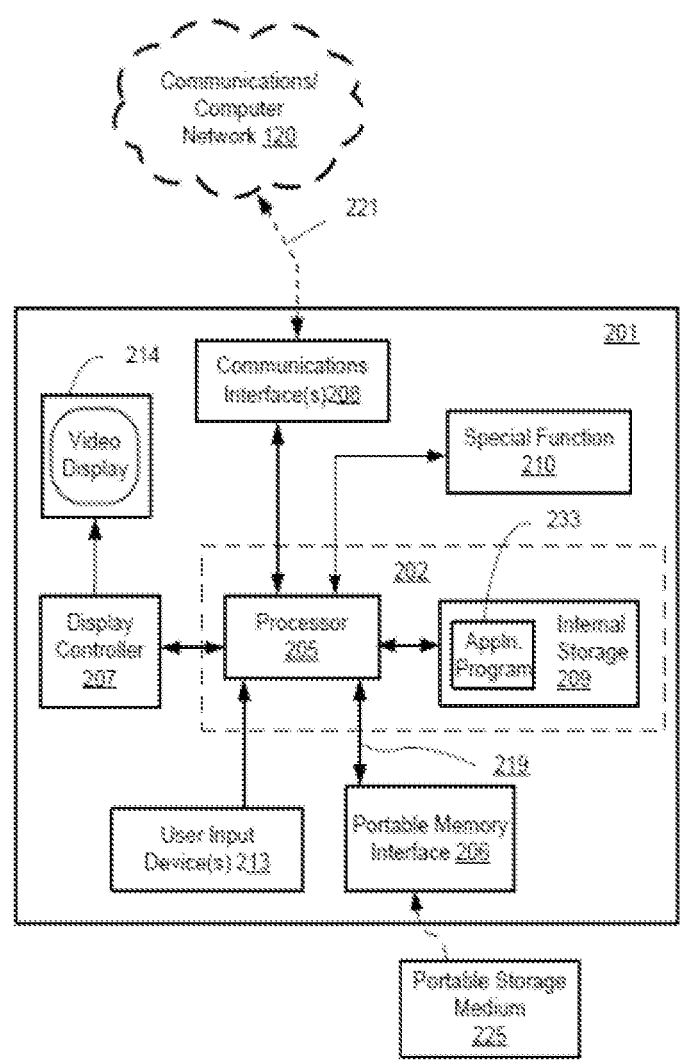
FIGS. 2A and 2B depict an embedded device 201, upon which a preferred embodiment of the method according to the present invention may be implemented.
Figure 2B:
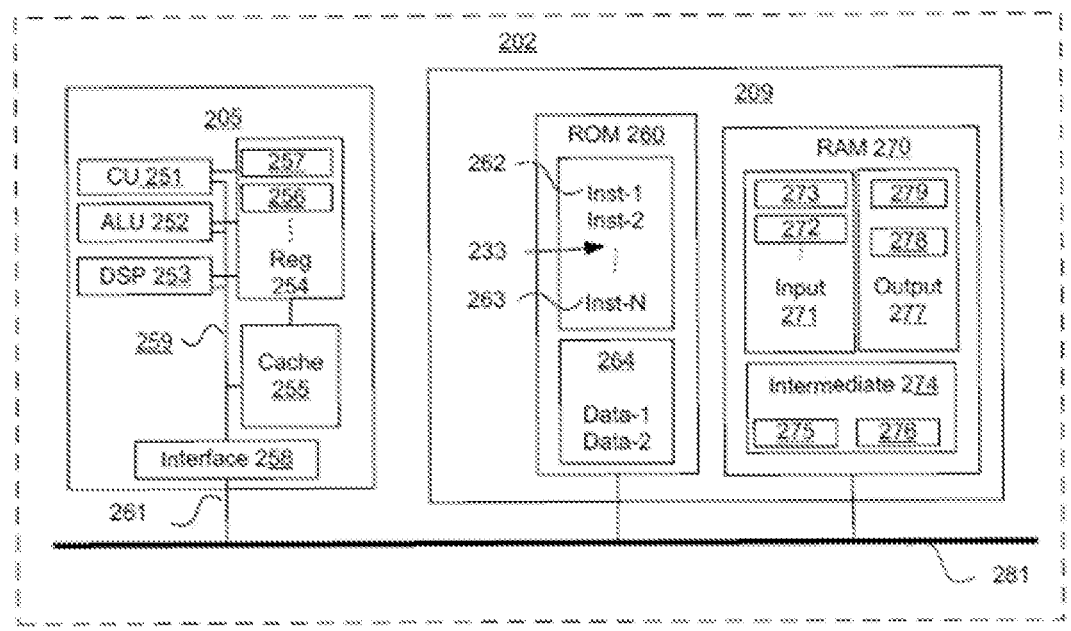

FIGS. 2A and 2B collectively form a schematic block diagram of a general purpose electronic device 201 including embedded components, upon which the writing detection and/or sharing methods to be described are desirably practiced. The electronic device 201 may be, for example, a mobile phone, a portable media player, virtual reality glasses, augmented reality glasses, or a digital camera, in which processing resources may be limited. Nevertheless, the methods to be described may also be performed on higher-level devices such as desktop computers, server computers, and other such devices with significantly larger processing resources.

As seen in FIG. 2A, the electronic device 201 comprises an embedded controller 202. Accordingly, the electronic device 201 may be referred to as an "embedded device." In the present example, the controller 202 has a processing unit (or processor) 205 which is bi-directionally coupled to an internal storage module 209. The storage module 209 may be formed from non-volatile semiconductor read only memory (ROM) 260 and semiconductor random access memory (RAM) 270, as seen in FIG. 2B. The RAM 270 may be volatile, non-volatile or a combination of volatile and non-volatile memory.

The electronic device 201 includes a display controller 207, which is connected to a display 214, such as a liquid crystal display (LCD) panel or the like. The display controller 207 is configured for displaying graphical images on the display 214 in accordance with instructions received from the embedded controller 202, to which the display controller 207 is connected.

The electronic device 201 also includes user input devices 213 which are typically formed by keys, a keypad or like controls. In some implementations, the user input devices 213 may include a touch sensitive panel physically associated with the display 214 to collectively form a touch-screen. Such a touch-screen may thus operate as one form of graphical user interface (GUI) as opposed to a prompt or menu driven GUI typically used with keypad-display combinations. Other forms of user input devices may also be used, such as a microphone (not illustrated) for voice commands or a joystick/thumb wheel (not illustrated) for ease of navigation about menus.

As seen in FIG. 2A, the electronic device 201 also comprises a portable memory interface 206, which is coupled to the processor 205 via a connection 219. The portable memory interface 206 allows a complementary portable memory device 225 to be coupled to the electronic device 201 to act as a source or destination of data or to supplement the internal storage module 209. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The electronic device 201 also has a communications interface 208 to permit coupling of the device 201 to a computer or communications network 220 via a connection 221. The connection 221 may be wired or wireless. For example, the connection 221 may be radio frequency or optical. An example of a wired connection includes Ethernet. Further, an example of wireless connection includes Bluetooth™ type local interconnection, Wi-Fi (including protocols based on the standards of the IEEE 802.11 family), Infrared Data Association (IrDa) and the like.

Typically, the electronic device 201 is configured to perform some special function. The embedded controller 202, possibly in conjunction with further special function components 210, is provided to perform that special function. For example, where the device 201 is a digital camera, the components 210 may represent a lens, focus control and image sensor of the camera. The special function component 210 is connected to the embedded controller 202. As another example, the device 201 may be a mobile telephone handset. In this instance, the components 210 may represent those components required for communications in a cellular telephone environment. Where the device 201 is a portable device, the special function components 210 may represent a number of encoders and decoders of a type including Joint Photographic Experts Group (JPEG), (Moving Picture Experts Group) MPEG, MPEG-1 Audio Layer 3 (MP3), and the like.

The methods described hereinafter may be implemented using the embedded controller 202, where the processes of FIGS. 3 to 5 may be implemented as one or more software application programs 233 executable within the embedded controller 202. The electronic device 201 of FIG. 2A implements the described methods. In particular, with reference to FIG. 2B, the steps of the described methods are effected by instructions in the software 233 that are carried out within the controller 202. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 233 of the embedded controller 202 is typically stored in the non-volatile ROM 260 of the internal storage module 209. The software 233 stored in the ROM 260 can be updated when required from a computer readable medium. The software 233 can be loaded into and executed by the processor 205. In some instances, the processor 205 may execute software instructions that are located in RAM 270. Software instructions may be loaded into the RAM 270 by the processor 205 initiating a copy of one or more code modules from ROM 260 into RAM 270. Alternatively, the software instructions of one or more code modules may be pre-installed in a non-volatile region of RAM 270 by a manufacturer. After one or more code modules have been located in RAM 270, the processor 205 may execute software instructions of the one or more code modules.

The application program 233 is typically pre-installed and stored in the ROM 260 by a manufacturer, prior to distribution of the electronic device 201. However, in some instances, the application programs 233 may be supplied to the user encoded on one or more CD-ROM (not shown) and read via the portable memory interface 206 of FIG. 2A prior to storage in the internal storage module 209 or in the portable memory 225. In another alternative, the software application program 233 may be read by the processor 205 from the network 220, or loaded into the controller 202 or the portable storage medium 225 from other computer readable media. Computer readable storage media refers to any non-transitory tangible storage medium that participates in providing instructions and/or data to the controller 202 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the device 201. Examples of transitory or non-tangible computer readable transmission media that may also participate in the provision of software, application programs, instructions and/or data to the device 201 include radio or infra-red transmission channels as well as a network connection to another computer or networked device, and the Internet or Intranets including e-mail transmissions and information recorded on Websites and the like. A computer readable medium having such software or computer program recorded on it is a computer program product.

The second part of the application programs 233 and the corresponding code modules mentioned above may be executed to implement one or more graphical user interfaces (GUIs) to be rendered or otherwise represented upon the display 214 of FIG. 2A. Through manipulation of the user input device 213 (e.g., the keypad), a user of the device 201 and the application programs 233 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 2B illustrates in detail the embedded controller 202 having the processor 205 for executing the application programs 233 and the internal storage 209. The internal storage 209 comprises read only memory (ROM) 260 and random access memory (RAM) 270. The processor 205 is able to execute the application programs 233 stored in one or both of the connected memories 260 and 270. When the electronic device 201 is initially powered up, a system program resident in the ROM 260 is executed. The application program 233 permanently stored in the ROM 260 is sometimes referred to as "firmware". Execution of the firmware by the processor 205 may fulfil various functions, including processor management, memory management, device management, storage management and user interface.

The processor 205 typically includes a number of functional modules including a control unit (CU) 251, an arithmetic logic unit (ALU) 252, a digital signal processor (DSP) 253 and a local or internal memory comprising a set of registers 254 which typically contain atomic data elements 256, 257, along with internal buffer or cache memory 255. One or more internal buses 259 interconnect these functional modules. The processor 205 typically also has one or more interfaces 258 for communicating with external devices via system bus 281, using a connection 261. In some embodiments, the processor 205 may be a collection of FPGA processors, known as a "graphics card", in which case the connection 261 is commonly a PCI-Express bus.

The application program 233 includes a sequence of instructions 262 though 263 that may include conditional branch and loop instructions. The program 233 may also include data, which is used in execution of the program 233. This data may be stored as part of the instruction or in a separate location 264 within the ROM 260 or RAM 270.

In general, the processor 205 is given a set of instructions, which are executed therein. This set of instructions may be organised into blocks, which perform specific tasks or handle specific events that occur in the electronic device 201. Typically, the application program 233 waits for events and subsequently executes the block of code associated with that event. Events may be triggered in response to input from a user, via the user input devices 213 of FIG. 2A, as detected by the processor 205. Events may also be triggered in response to other sensors and interfaces in the electronic device 201.

The execution of a set of the instructions may require numeric or non-numeric variables to be read and modified. Such numeric variables are stored in the RAM 270. The disclosed method uses input variables 271 that are stored in known locations 272, 273 in the memory 270. The input variables 271 are processed to produce output variables 277 that are stored in known locations 278, 279 in the memory 270. Intermediate variables 274 may be stored in additional memory locations in locations 275, 276 of the memory 270. Alternatively, some intermediate variables may only exist in the registers 254 of the processor 205.

The execution of a sequence of instructions is achieved in the processor 205 by repeated application of a fetch-execute cycle. The control unit 251 of the processor 205 maintains a register called the program counter, which contains the address in ROM 260 or RAM 270 of the next instruction to be executed. At the start of the fetch execute cycle, the contents of the memory address indexed by the program counter is loaded into the control unit 251. The instruction thus loaded controls the subsequent operation of the processor 205, causing for example, data to be loaded from ROM memory 260 into processor registers 254, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the methods described below is associated with one or more segments of the application program 233, and is performed by repeated execution of a fetch-execute cycle in the processor 205 or similar programmatic operation of other independent processor blocks in the electronic device 201.

Referring to FIG. 3 (together with FIGS. 6A to 7C) there is a computer-implemented method 300 for extracting content 302 from a physical writing surface 304, for example content 302 written by a pen (not shown) on a sheet of paper (not shown), or by a marker (not shown) on a whiteboard (not shown). The method 300 includes steps 501 to 563 which are non-sequential in that they may be performed in a number of different sequences, where the flow of information allows it. The presently described preferred embodiment is the best way known to the applicant at the time of filing the application of performing the method 300. The method 300 commences at step 501 by capturing a reference frame 306 using the camera 210. The reference frame 306 includes image data relating to at least a portion of the physical writing surface 304. The image data is configured in a set of data points specifying, for example, an array of pixels in a bit-map-type image file, representing the reference frame. The reference frame 306, in the preferred embodiment, is transmitted from the electronic device 201 to the computer system 100, e.g. a server, using the communications interface 208. However, in another embodiment, the subsequent steps may be carried out using the processing unit 205 of the electronic device 201. In yet another embodiment, the subsequent steps may be carried out by a plurality of servers 100.

At step 503, the processor unit 105 determines one or more extraction regions 308 present in the reference frame 306. The extraction region 308 include a subset of the set of data points from which the content 302 is to be extracted. The processor unit 105 is configured to operate an extraction region artificial neural net (ERNN) 310 to perform step 503. The ERNN 310, in the preferred embodiment, is a convolutional neural network having an input layer 312, and output layer 314. Between the input layer 312 and the output layer 314, the ERNN is structured as per Table 1 below:

TABLE 1

| Layer Name | Dimension | Filters | Stride |
| --- | --- | --- | --- |
| Batch Norm. 1 | | | |
| Conv. 1a | 64 | 3 × 3 | 0 |
| Conv. 1b | 64 | 3 × 3 | 1 |
| Maxpool 1 & SKIP S1 | | 2 × 2 | |
| Batch Norm. 2 | | | |
| Conv. 2a | 128 | 3 × 3 | 1 |
| Conv. 2b | 128 | 3 × 3 | 1 |
| Maxpool 2 & SKIP S2 | | 2 × 2 | |

TABLE 1-continued

| Layer Name | Dimension | Filters | Stride |
|---|---|---|---|
| Batch Norm. 3 | | | |
| Conv. 3a | 128 | 3 × 3 | 1 |
| Conv. 3b | 128 | 3 × 3 | 1 |
| Maxpool 3 & SKIP S3 | | 2 × 2 | |
| Batch Norm. 4 | | | |
| Conv. 4a | 256 | 3 × 3 | 1 |
| Conv. 4b | 256 | 3 × 3 | 1 |
| Maxpool 4 & SKIP S4 | | 2 × 2 | |
| Batch Norm. 5 | | | |
| Conv. 5a | 512 | 3 × 3 | 1 |
| Conv. 5b | 512 | 3 × 3 | 1 |
| Maxpool 5 | | 2 × 2 | |
| Batch Norm. 6 | | | |
| Conv. 6 | 256 | 3 × 3 | 1 |
| De-Conv. 6 | 256 | 3 × 3 | 2 |
| Concatenate S4 | | | |
| Batch Norm. 7 | | | |
| Conv. 7 | 128 | 3 × 3 | 1 |
| De-Conv. 7 | 128 | 3 × 3 | 2 |
| Concatenate S3 | | | |
| Batch Norm. 8 | | | |
| Conv. 8 | 64 | 3 × 3 | 1 |
| De-Conv. 8 | 64 | 3 × 3 | 2 |
| Concatenate S2 | | | |
| Batch Norm. 9 | | | |
| Conv. 9 | 32 | 3 × 3 | 1 |
| De-Conv. 9 | 32 | 3 × 3 | 2 |
| Concatenate S1 | | | |
| Batch Norm. 10 | | | |
| Conv. 10 | 16 | 3 × 3 | 1 |
| De-Conv. 10 | 16 | 3 × 3 | 2 |
| Conv. 11 | 1 | 1 × 3 | 1 |
| Sigmoid | | | |

The SKIP function is defined by Table 2:

TABLE 2

| Layer Name | Filters | Dimension | Stride | Activation |
|---|---|---|---|---|
| Conv. 1a | 1 × 1 | 4 | 1 | Relu Function. |
| Batch Norm. | | | | |

The ERNN 310 is trained to determine one or more extraction regions 308 using a set of ERNN training images 320. Examples of suitable ERNN training images 320 are shown in FIGS. 6A-7C. The ERNN training images 320 are manually created to train the ERNN 310 to recognise extraction regions 308 relating to one or more of whole images of physical writing surfaces 304, partial images of physical writing surfaces 304, images of physical writing surfaces 304 being obstructed by an object 362.

Step 503 also includes adding a boundary 322 of black pixels about the reference frame 306. The input layer 312 of the ERNN 310 is fed the reference frame 306 together with the boundary 322, so that, when the reference frame 306 only includes a portion of the physical writing surface 304, the ERNN can determine bounds of the entire physical writing surface, extending into the boundary 322. The ERNN 310 may determine one or more extraction regions 308. In the preferred embodiment, only one extraction region 308 is selected, at step 505, for contact extraction, at step 521. The selection of the extraction region, at step 505, is performed by determining the number of pixels in the reference frame 306, without the boundary 322, relating to each extraction region 308. The extraction region 308 with the largest number of pixels is selected. In another embodiment, step 503 may be performed after transforming each extraction region 308 at step 535, and is performed by determining an area relating to each extraction region 308 and select the extraction region 308 with the largest area. However, while this alternate embodiment may provide some advantages, the alternate embodiment performs steps 429 to 435 on multiple extraction regions 308 and is therefore more computationally intensive.

Figure 6A:
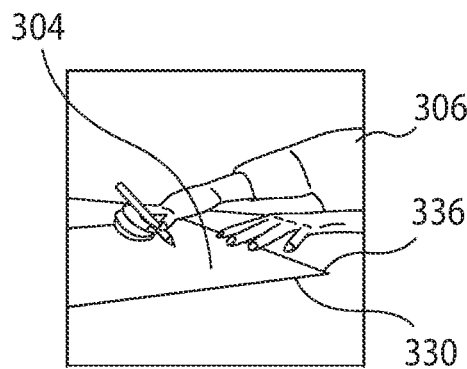
FIGS. 6A to 6C are sample training images for an extraction region neural network used in the method of FIG. 3.
Figure 6B:
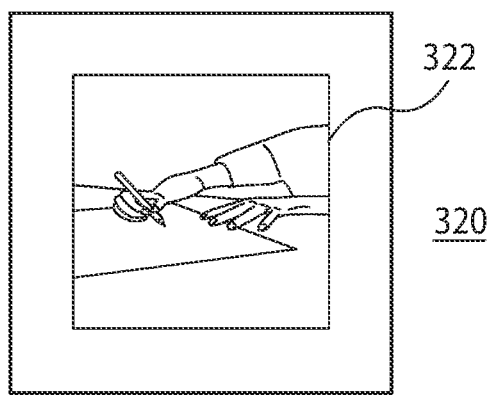
Figure 6C:
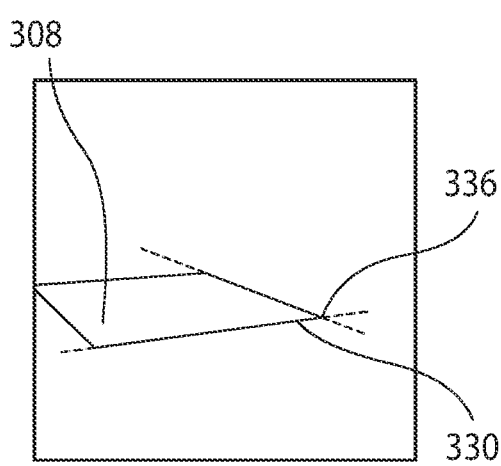
Figure 7C:
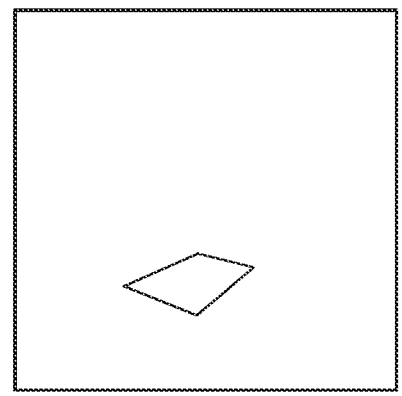

After selection of the extraction region 308 at step 505, the processor 105 executes instructions at step 529 to determine at least two edges 330 of the extraction region 308. Many edge detection methods could be used, such as the Canny algorithm (Canny, J., *A Computational Approach To Edge Detection*, IEEE Transactions on Pattern Analysis and Machine Intelligence, 8(6):679-698, 1986). The processor 105 then, at step 531, as shown in FIG. 6C, fits a straight line 332 to each edge 330 and finds intersection coordinates 334 of the straight line 332. Using the intersection coordinates 334 the processor 105 determines the coordinates, or location, for each corner 336 of the physical writing surface 304 in the reference frame 306. When applying the method 300 to the reference frame 306, step 533 is not required. In an alternative embodiment, the locations 334 of the corners 336 may be determined manually by the user using inputs of the device 201.

After determining the locations 334 of the corners 336, the processor 105, at step 535, determines a transformation vector 340 to transform the extraction region 308 such that the corners 336 are congruent with a normal projection 342 of the physical writing surface 304. In the preferred embodiment, the normal projection 342 is determined by a user selection of the format of the physical writing surface (i.e. A3, A4, Letter, etc.). In another embodiment, the processor 105 is adapted to determine the normal projection 342 by analysing a number of frames taken using the device 201 at different locations, the relative distance between the locations having been determined using the special function components 210, including, for example, an accelerometer.

Figure 8:
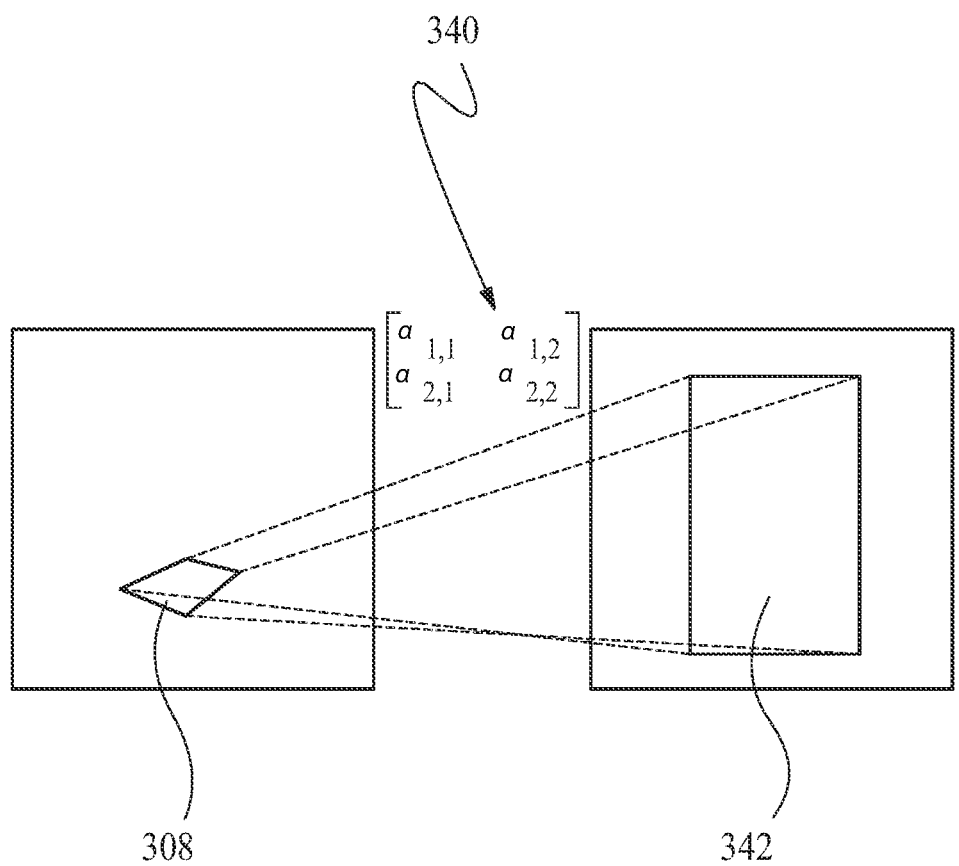
FIG. 8 is an illustration of a transformation vector applied by the method of FIG. 3.

At step 535, as shown in FIG. 8 the processor 105 also transforms the extraction region 308 using the transformation vector 340.

The processor 105 is configured to operate an object region artificial neural net (ORNN) 350 to perform step 537. The ORNN 350, in the preferred embodiment, is a convolutional neural network having an input layer 352, and output layer 354. Between the input layer 352 and the output layer 354, the ORNN is structured as per Table 3 below.

TABLE 3

| Layer Name | Dimension | Filters | Stride |
|---|---|---|---|
| Conv. 1a | 64 | 3 × 3 | 1 |
| Conv. 1b | 64 | 5 × 5 | 1 |
| Maxpool 1 | | 2 × 2 | |
| Batch Norm. 1 | | | |
| Relu SKIP S1 | | | |
| Conv. 2a | 64 | 3 × 3 | 1 |
| Conv. 2b | 64 | 5 × 5 | 1 |
| Maxpool 2 | | 2 × 2 | |
| Batch Norm. 2 | | | |
| Relu SKIP S2 | | | |
| Conv. 3a | 128 | 3 × 3 | 1 |
| Conv. 3b | 128 | 5 × 5 | 1 |
| Maxpool 3 | | 2 × 2 | |

TABLE 3-continued

| Layer Name | Dimension | Filters | Stride |
|---|---|---|---|
| Batch Norm. 3 | | | |
| Relu SKIP S3 | | | |
| Conv. 4a | 128 | 3 × 3 | 1 |
| Conv. 4b | 128 | 5 × 5 | 1 |
| Maxpool 4 | | 2 × 2 | |
| Batch Norm. 4 | | | |
| Relu SKIP S4 | | | |
| Conv. 5a | 256 | 3 × 3 | 1 |
| Conv. 5b | 256 | 5 × 5 | 1 |
| Maxpool 5 | | 2 × 2 | |
| Batch Norm. 5 | | | |
| Relu SKIP S5 | | | |
| Conv. 6 | 256 | 3 × 3 | 1 |
| De-Conv. 6 | 256 | 3 × 3 | 2 |
| Batch Norm. 6 | | | |
| Concatenate S4 | | | |
| Conv. 7 | 128 | 3 × 3 | 1 |
| De-Conv. 7 | 128 | 3 × 3 | 2 |
| Batch Norm. 7 | | | |
| Concatenate S3 | | | |
| Conv. 7 | 64 | 3 × 3 | 1 |
| De-Conv. 7 | 64 | 3 × 3 | 2 |
| Batch Norm. 7 | | | |
| Concatenate S2 | | | |
| Conv. 8 | 32 | 3 × 3 | 1 |
| De-Conv. 8 | 32 | 3 × 3 | 2 |
| Batch Norm. 8 | | | |
| Concatenate S1 | | | |
| Conv. 9 | 16 | 3 × 3 | 1 |
| De-Conv. 9 | 16 | 3 × 3 | 2 |
| Batch Norm. 9 | | | |
| Conv. 10 | 1 | 1 × 1 | 1 |
| Sigmoid | | | |

Wherein the SKIP function is defined by Table 4:

TABLE 4

| Layer Name | Filters | Stride | Activation |
|---|---|---|---|
| Conv. 1a | 1 × 1 | 1 | Relu Function. |
| Batch Norm. | | | |

The ORNN 350 is trained to determine an object region 360 using a set of ORNN training images 370. The object region 360 includes a subset of the set of data points which do not relate to the content 302 to be extracted. Examples of suitable ORNN training images 370 are shown in FIGS. 9A to 10B. The ORNN training images 370 are manually created to train the ORNN 350 to recognise the object region 360 relating to one or more objects 362, such as a user's hand 362a, a pen 362b held by the user's hand 362a or on the physical writing surface 304, and other objects 362c on the physical writing surface 304.

At step 539, the processor 105 executes instructions to remove pixels in the object region 360 from the extraction region 308. The method 300 then continues at step 521 for extracting content 302 from the extraction region 308 of the reference frame 306. In the preferred embodiment, content 302 relates to writing, images, sketches, and other physical marks on the physical writing surface 304. In other embodiments, content may include marks displayed on a display device within the view of the embedded device 201.

The processor 105 is configured to operate a content artificial neural net (CNN) 380 to perform step 521 to extract the content 302 from the extraction region 308. The CNN 380, in the preferred embodiment, is a convolutional neural network having an input layer 382, and output layer 384. Between the input layer 382 and the output layer 384, the CNN is structured as per Table 3 below.

TABLE 5

| Layer Name | Dimension | Filters | Stride |
|---|---|---|---|
| Conv. 2a | 16 | 3 × 3 | 1 |
| Conv. 1b | 16 | 3 × 3 | 1 |
| Maxpool 1 | | 2 × 2 | |
| SKIP S1 | | | |
| Conv. 2a | 128 | 3 × 3 | 1 |
| Conv. 2b | 128 | 3 × 3 | 1 |
| Maxpool 2 | | 2 × 2 | |
| SKIP S2 | | | |
| Conv. 3a | 256 | 3 × 3 | 1 |
| Conv. 3b | 256 | 3 × 3 | 1 |
| Maxpool 3 | | 2 × 2 | |
| SKIP S3 | | | |
| Conv. 4a | 512 | 3 × 3 | 1 |
| Conv. 4b | 512 | 3 × 3 | 1 |
| Maxpool 4 | | 2 × 2 | |
| SKIP S4 | | | |
| Batch Norm. 1 | | | |
| De-Conv. 1a | 256 | 3 × 3 | 1 |
| De-Conv. 1b | 256 | 3 × 3 | 2 |
| Concatenate S3 | | | |
| Batch Norm. 2 | | | |
| De-Conv. 2a | 128 | 3 × 3 | 1 |
| De-Conv. 2b | 128 | 3 × 3 | 2 |
| Concatenate S2 | | | |
| Batch Norm. 3 | | | |
| De-Conv. 3a | 64 | 3 × 3 | 1 |
| De-Conv. 3b | 64 | 3 × 3 | 2 |
| Concatenate S1 | | | |
| Batch Norm. 4 | | | |
| De-Conv. 4a | 16 | 3 × 3 | 1 |
| De-Conv. 4b | 16 | 3 × 3 | 2 |
| Conv. 5 | 1 | 1 × 1 | 1 |
| Sigmoid | | | |

Wherein the SKIP function is defined by Table 6:

TABLE 6

| Layer Name | Filters | Stride | Rate | Activation |
|---|---|---|---|---|
| Conv. 1a | 1 × 1 | 1 | 1 | Relu Function. |
| Conv. 1b | 3 × 3 | 1 | 1 | Relu Function. |
| Conv. 1c | 3 × 3 | 1 | 2 | Relu Function. |
| Conv. 1d | 3 × 3 | 1 | 4 | Relu Function. |
| Concatenate | | | | |
| Batch Norm. | | | | |

The CNN 380 is trained to extract content 302 from the extraction region 308 using a set of CNN training images 390. Examples of suitable CNN training images 390 are shown in FIGS. 11A to 12B. The CNN training images 390 are manually created to train the CNN 380 to determine the pixels in the extraction region 308 that relate to content 302. The CNN training images 390 include manually created pairs of images containing imperfections such as shadows on the physical writing surface 304, reflections on the physical writing surface 304, and lack of sharpness of the content 302. Optionally, the data in the extraction region 308 may be altered using dynamic adaptive thresholding to optimise the performance of the CNN 380 on a larger range of image quality of the reference frame 306. Further optionally, the training images 390 may be altered automatically by adding blur and/or noise filters with random settings to add additive noise, gaussian noise, and the like, to train the CNN 380 to remove a lack of sharpness, such as blur or noise.

As shown in FIG. 3, the method 300 concludes processing of the reference frame 306, in the preferred embodiment, by writing the content 302 to a display frame 394. In an alternative embodiment, the CNN 380 is configured such that the display frame 394 is a direct output of the CNN 380. The display frame 394 may be displayed on the display device 114, the display 214, or an alternate display (not shown) in communication with the computer system 100 such that the display frame 394 may be sent to an alternate display.

As also shown in FIG. 3, the method 300 continues at step 525 by capturing a subsequent frame 406 using the camera 210. The subsequent frame 406 includes subsequent image data relating to at least a portion of the physical writing surface 304. The subsequent image data is configured in a subsequent set of data points specifying, for example, an array of pixels in a bit map-type image file, representing the subsequent frame 406. The subsequent frame 406, in the preferred embodiment, is transmitted from the electronic device 201 to the computer system 100 using the communications interface 208. However, in another embodiment, the subsequent steps may also be carried out using the processing unit 205 of the electronic device 201.

At step 527, the processor unit 105 determines one or more subsequent extraction regions 408 present in the subsequent frame 406. The subsequent extraction region includes a subset of the subsequent set of data points from which content 402 is to be extracted. The processor unit 105 is configured to operate the ERNN 310 to perform step 527 substantially similarly to the performance of step 503. Step 527 also includes adding the boundary 322 of black pixels about the subsequent frame 406. The input layer 312 of the ERNN 310 is fed the subsequent frame 406 together with the boundary 322, so that, when the subsequent frame 406 only includes a portion of the physical writing surface 304, the ERNN 310 can determine bounds of the entire physical writing surface 304, extending into the boundary 322. The ERNN 310 may determine, at step 527, one or more subsequent extraction regions 408. In the preferred embodiment, only one subsequent extraction region 408 is selected, at step 505 following step 527, for contact extraction, at step 543. The selection of the subsequent extraction region 408, at step 505, is performed substantially similarly to the selection of the extraction region 308 at step 505.

After selection of the extraction region 408 at step 527, the processor 105 executes instructions at step 529 to determine at least two edges 430 of the subsequent extraction region 408. Any suitable edge detection method may be used, such as the Canny algorithm. The processor 105 then, at step 531, as shown in FIG. 6C, fits a straight line 432 to each edge 430 and finds intersection coordinates 434 of the straight lines 432. The processor 105 uses the intersection coordinates 434 to determine the coordinates, or location, for each subsequent corner 436 of the physical writing surface 304 in the subsequent frame 406.

At step 533, the processor 105 applies a Kalman filter to the coordinates 334, 434 to determine a stabilized corner location 438 for each subsequent corner 436 and overwrites the coordinates 434 with the stabilized corner location 438.

After determining the stabilised corner locations 438, the processor 105, at step 535, determines a subsequent transformation vector 440 to transform the subsequent extraction region 408 such that the corners 436 are congruent with the normal projection 342 of the physical writing surface 304.

At step 535, as shown in FIG. 8 the processor 105 also transforms the subsequent extraction region 408 using the transformation vector 440.

The processor 105 is configured to operate the ORNN 350 to perform step 537 on the subsequent extraction region 408 to determine a subsequent object region 460. The subsequent object region 460 includes a subset of the set of data points which do not relate to the subsequent content 402 to be extracted. At step 539, the processor 105 executes instructions to remove pixels in the subsequent object region 460 from the subsequent extraction region 408. The method 300 then continues at step 543 for extracting subsequent content 402 from the subsequent extraction region 408 of the subsequent frame 406.

The processor 105 is configured to operate the CNN 380 to perform step 543 to extract the subsequent content 402 from the subsequent extraction region 408 substantially similarly to step 521 of extracting content 302 from the extraction region 308. In an alternative embodiment, the CNN 380 is configured to directly output the display frame 394, for example by using the display frame 394 prior to extraction of the subsequent content 402 as an input to the CNN 380. Additionally, previous subsequent frames 406 may be used as inputs to the CNN 380.

As shown in FIG. 5, the processor 105 now performs steps 445 to 459 to align and merge the subsequent content 402 with the content 302 on the display frame 394. Specifically, at step 545 the processor 105 uses a registration algorithm, such as a BRISK algorithm to make a first, approximate, determination of an alignment vector 470 to align the subsequent content 402 with the content 302 on the display frame 394. The processor 105, in the same step, refines the determination of the BRISK algorithm (Liu, Yanli et al. "A FAST-BRISK Feature Detector with Depth Information." Sensors (Basel, Switzerland) vol. 18, 11 3908. 13 Nov. 2018) by applying an optical flow algorithm, for example, a Farneback algorithm (Farnebäck, Gunnar. (2003). Two-Frame Motion Estimation Based on Polynomial Expansion. In: Image analysis. 2749. 363-370. 10.1007/3-540-45103-X_50) to determine the alignment vector 470 to account for complex distortions of the physical writing surface 304, or the subsequent frame 406. At step 547, the processor 105 determines whether the alignment vector 470 was successfully determined and performs a quality check, for example, by determining that the magnitude of the components of the alignment vector 470 are within predetermined bounds.

If the alignment vector 470 fails step 547, the processor 105, at step 549, determines a further alignment vector 472 to align and merge the subsequent content 402 with the content 302 on a further display frame 494. The further display frame 494 includes content 302 relating to a different physical writing surface 304 than the physical writing surface 304 to which the content 302 on further display frame 394 relates. The further alignment vector 472 is then subjected to the quality checks of step 547. Steps 447 and 449 iterate until a further alignment vector 472 is found that passes step 547. If no further alignment vector 472 can be found that passes the quality check of step 547, the processor 105, at step 551, creates a further display frame 494 and writes the subsequent content 402 to the further display frame 494 as if it were content 302 from a reference frame 306.

If the alignment vector 470 passes step 547, the processor 105 stores the alignment vector 470 and performs a further quality check, at step 553. Step 553 determines, where the method 300 is performed repeated for a period of time for a series of subsequent frames 406, whether a component of the series of alignment vectors 470 of multiple subsequent frames 406 in the series of subsequent frames 406 is substantially similar in magnitude, indicating that the subsequent content 402 requires substantially the same alignment to the content 302 over the period of time. This indicates that the content 302 is misaligned on the display frame 394 due to an error or malfunction of the processing of the reference frame 306. If such substantial similarity is determined by the processor 105 at step 553, the processor 105, at step 555, executes instructions to transform the content 302 on the display frame 394 by an inverse of the component of the alignment vector 470 that was determined to be substantially the same.

If no substantial similarity is detected at step 553, the processor 105, at step 557, aligns the subsequent content 402 with the content 302 on the display frame 394 by applying the alignment vector 470 to the subsequent content 402. Alternatively, if the further alignment vector 472 was determined at step 549 and passed step 547, the processor 105, at step 557, aligns the subsequent content 402 with the content 302 on the further display frame 494 by applying the further alignment vector 472 to the subsequent content 402.

In an alternative embodiment, the physical writing surface 304 includes a set of parallel lines (not shown), usually found on commercially available paper suitable for writing. In this embodiment steps 445 to 459 are performed before step 543 (being the step of extracting content), as the set of parallel lines can be used to perform the alignment of the subsequent extraction region 408 to the display frame 394. In order to isolate the set of parallel lines, the processor 105 applies a fast fourier transform filter to determine the regularly occurring lines in the subsequent extraction region 408.

Following step 557, the processor 105 performs a buffering step 559. During the buffering step 559, the processor determines content 302, 402 to be removed from the display frame 394 and/or the further display frame 494. The determination of which content 302, 402 should be removed from the display frame 394, 494 may be based on one or more of: a period of time since the content 302, 402 was written to the display frame 394, 494, a period of time for which the content 302, 402 was within the object region 360, 460, and/or whether the content 302, 402 is in the object region 460 of the subsequent frame 406 being presently processed by the processor 105. Generally, the buffering step 559 involves removing the subsequent content 402 associated with an earlier subsequent frame 406 in the series of subsequent frames 406 related to the display frame 394, 494. The processor 105 then removes the content 302, 402 which has been determined should be removed, from the display frame 394, 494.

At step 561, the processor 105 writes the subsequent content 402 to the display frame 394 or the further display frame 494, depending on whether the alignment vector 470 or the further alignment vector 472 was used in step 557.

As shown in FIG. 3, the display frame 394 may continue to be displayed and/or updated on the display device 114, the display 214, or a second display 514 in communication with the computer system 100 such that the display frame 394 may be sent to the second display 514. Similarly, the display frame 394 may be projected, using a projector (not shown) onto a second physical writing surface 504, for example a projector/whiteboard combination commonly known as an interactive whiteboard. In some embodiments, the second physical writing surface 504 may also include content 502 to be extracted using the method 300 to a second display frame 594. In these embodiments, the second display frame may be projected onto the physical writing surface 304. Instead of projecting the display frames 394, 594 using the projector, the second display frame 514 may be embodied with a digital content input interface (not shown) to add the content 504.

Although the steps of the method 300 have been described as being executed by the processor 105 or the processor 205, those skilled in the art would appreciate that this is merely the preferred embodiment, and any step of the method 300 could be executed by either the processor 105 or the processor 205, depending on the requirements of the particular embodiment.

In one embodiment, the physical writing surface 304 includes a plurality of separate writing surfaces 304n, each including content 302n to be extracted. In one example, the separate writing surfaces 304n are sticky notes. In this embodiment, the processor 105 determines an extraction region 308n for each sticky note 304n, and associates content 302n extracted from each extraction region 308n with a coordinate indicative of the position of the separate writing surface 304n in the physical writing surface 304. The content 302n may be written in composite to the same display frame 394 or separately each to a respective display frames 394n.

Advantages of the method 300 will now be discussed.

Because the method 300 extracts subsequent content 402 from the physical writing surface 304, the method 300 is able to update the display frame 394 with subsequent content 402 that was added to the physical writing surface 304 since the reference frame 306 was received.

By determining the corners 336, 436 using an intersection of straight lines 332, 432, the method 300 is able to reduce variance in the locations 436 of the corners 336, 436 over a period of time that do not correspond to an actual change in the locations 436 of the corners 336, 436 but are merely a result of frame capture and artefacts introduced by image processing. Fluctuations in the data points located at the edge of the extraction region 308, 408 will only have a very limited effect on the straight lines 332, 432 fitted to the edges 330, 430. The variance in the locations 436 of the corners 336, 436 can be further limited by applying the Kalman filter to the series of corner locations 436 to determine the stabilized corner locations 438.

By transforming the extraction regions 308, 408, the method 300 is able to adapt to changing relative angles between the frames 306, 406 and the physical writing surface 304. That is, it is possible to move the device 201 relative to the physical writing surface 304, or the physical writing surface 304 relative to the device 201, and the transformation of the extraction regions 308, 408 results in the same extraction region 308, 408 being processed by the method 300.

By determining the object region 360, 460, the method 300 is able to remove non-content related data points from consideration by the CNN 380. This exclusion substantially improves the performance of the CNN 380. By determining the object region 360, 460, it is also possible to adjust the buffering step 559 to delay removal of content 302, 402 currently on the display frame 394 that is hidden by the object 362 until the location on the display frame 394 that corresponds to the content 302, 302 hidden by the object 362 is captured in a new subsequent frame 406. This is achieved by removing the period of time within which the content 302, 402 was within the object region 360, 460 from the period of time since the content 302, 402 was written to the display frame 394. Additionally, content 302, 402 that is currently within the object region 360, 460 is thereby prevented from being removed from the display frame 394. This prevents such content 302, 402 from being removed from the display frame 394 when hidden by the object 362.

As the effects of shadows, reflections, and lack of sharpness are removed from the image data during extraction, or iterative extraction, of the content 302, 402, the method 300 performs more reliably.

The step 557 of aligning the subsequent content 402 with the content 302 results in an increased sharpness of the display frame 394, as the content 402 is written precisely on top of the content 302, avoiding blurring of the display frame 394 that would otherwise be caused by small inaccuracies in the position of the content 402 in the transformed extraction region 406.

By performing the quality checks at steps 547 and 553 on the alignment vector 370 and/or the further alignment vector 372, the method 300 is able to recognise multiple physical writing surfaces 304 and write content 302, 402 to the respective display frame 394, 494 associated with each physical writing surface. Similarly, the method 300 is able to recover a failure in capture of the reference frame 306, or otherwise a permanent drift in content position on the display frame 394, by applying an inverse of the component of the alignment vector 370 to the content 302 on the display frame, if it is substantially similar in magnitude over a series of subsequent frames 406.

By selecting the largest extraction region 308, 408, in the frame 306, 406, the method 300 can easily identify the extraction region 308, 408 currently being used by the user.

The boundary 322 assists the ERNN 310 in determining extraction regions 308 when the reference frame 306 only includes a partial image of the physical writing surface 304.

Projecting the display frames 394, 594 onto the physical writing surfaces 304, 504, or showing the display frame 394 on the second display 514 with the content input interface allows seamless exchange of content 302, 502 between two or more users while being shown display frames 394, 594 that are substantially identical.

According to a further example, which may be used in conjunction with one or more of the herein described methods and/or systems and/or non-transitory computer-readable media, a processor (as described herein) may be arranged, under instructions from executable software, to monitor changes being made to content on a physical writing surface. Where the processor determines that the changes made are above a defined threshold, the current image is not updated (using the techniques described herein), but instead a new image is generated (as described herein). That is, for example, the new image may be generated and stored separate to the previous image.

According to one example, the processor may be arranged to determine whether a current image is similar to a previous image. The processor may generate (e.g. calculate) a similarity score using known techniques for comparing images. That is, the similarity score is associated with how similar the current image is with the previous image. The processor may then determine whether the generated similarity score is below a defined threshold, and if so, save the current image as a new image. It will be understood that the processor may be arranged to determine whether the generated similarity score is above a defined threshold, and if so, not save the current image as a new image but keep updating the current image.

The physical writing surface used with the similarity process may be, for example, a whiteboard on which changes may be made very easily by changing, clearing or erasing at least some, and possibly all, of the content from the whiteboard (e.g. by cleaning or wiping the whiteboard and generating new content). Other suitable physical writing surfaces may also be used with this similarity process where content can be readily changed, cleared, erased etc.

| Reference Numerals: | |
| --- | --- |
| 100 | Computer system |
| 101 | Computer module |
| 102 | keyboard |
| 103 | Mouse pointer device |
| 104 | interconnected bus |
| 105 | processor unit |
| 106 | memory unit |
| 107 | audio-video interface |
| 108 | interface |
| 109 | storage devices |
| 110 | hard disk drive |
| 111 | local network interface |
| 112 | optical disk drive |
| 113 | I/O interface |
| 114 | display device |
| 115 | printer |
| 116 | Modem |
| 117 | loudspeaker |
| 118 | connection |
| 119 | connections |
| 120 | wide communications network |
| 121 | connection |
| 122 | local communications network |
| 123 | connection |
| 124 | connection |
| 125 | disk storage medium |
| 126 | scanner |
| 127 | camera |
| 128 | memory location |
| 129 | memory location |
| 130 | memory location |
| 131 | instructions |
| 132 | data |
| 133 | software application programs |
| 134 | memory |
| 135 | memory location |
| 136 | memory location |
| 137 | memory location |
| 139 | control unit |
| 140 | arithmetic logic unit |
| 141 | internal bus |
| 142 | interface |
| 144 | storage register |
| 145 | storage register |
| 146 | storage register |
| 148 | cache memory |
| 149 | ROM |
| 150 | POST program |
| 151 | BIOS module |
| 152 | bootstrap loader program |
| 153 | operating system |
| 154 | input variable |
| 155 | memory location |
| 156 | memory location |
| 157 | memory location |
| 158 | intermediate variables |
| 159 | memory location |
| 160 | memory location |
| 161 | output variable |
| 162 | memory location |
| 163 | memory location |
| 164 | memory location |
| 166 | memory location |
| 167 | memory location |

| Reference Numerals: | |
|---|---|
| 180 | microphone |
| 201 | electronic device |
| 202 | embedded controller |
| 205 | processing unit |
| 206 | portable memory interface |
| 207 | display controller |
| 208 | communications interface |
| 209 | internal storage module |
| 210 | special function components |
| 213 | user input devices |
| 214 | display |
| 220 | communications network |
| 221 | connection |
| 225 | portable memory device |
| 233 | software application programs |
| 251 | control unit |
| 252 | arithmetic logic unit |
| 253 | digital signal processor |
| 254 | registers |
| 255 | cache memory |
| 256 | atomic data element |
| 257 | atomic data element |
| 258 | interface |
| 259 | internal bus |
| 260 | ROM |
| 261 | connection |
| 262 | instruction |
| 263 | instruction |
| 264 | location |
| 270 | RAM |
| 271 | input variable |
| 272 | known location |
| 273 | known location |
| 274 | intermediate variable |
| 275 | location |
| 276 | location |
| 277 | output variable |
| 278 | known location |
| 279 | known location |
| 281 | system bus |
| 300 | method |
| 302 | content |
| 303 | display frame |
| 304 | physical writing surface |
| 306 | reference frame |
| 308 | extraction region |
| 310 | ERNN |
| 312 | input layer |
| 314 | output layer |
| 320 | ERNN training images |
| 322 | boundary |
| 330 | edges |
| 332 | straight line |
| 334 | intersection coordinates |
| 336 | corner |
| 340 | transformation vector |
| 342 | normal projection |
| 350 | ORNN |
| 352 | input layer |
| 354 | output layer |
| 360 | object region |
| 362 | object |
| 362a | user's hand |
| 362b | pen |
| 362c | objects on PWS |
| 370 | ORNN training images |
| 380 | CNN |
| 380 | CNN |
| 382 | input layer |
| 384 | output layer |
| 390 | CNN training images |
| 394 | display frame |
| 402 | subsequent content |
| 404 | second physical writing surface |
| 406 | subsequent frame |
| 408 | subsequent extraction region |
| 430 | edges |

| Reference Numerals: | |
|---|---|
| 432 | straight line |
| 434 | intersection coordinates |
| 436 | corners |
| 438 | stabilised corner location |
| 440 | transformation vector |
| 460 | subsequent object region |
| 470 | alignment vector |
| 472 | further alignment vector |
| 494 | further display frame |
| 502 | content |
| 504 | second physical writing surface |
| 594 | second display frame |
| 514 | second display |

The invention claimed is:

1. A computer-implemented method for extracting content from a physical writing surface, the method comprising the steps of:
   (a) receiving a reference frame including image data relating to at least a portion of the physical writing surface, the image data including a set of data points;
   (b) determining an extraction region, the extraction region including a subset of the set of data points from which content is to be extracted;
   (c) extracting content from the extraction region and writing the content to a display frame;
   (d) receiving a subsequent frame including subsequent image data relating to at least a portion of the physical writing surface, the subsequent image data including a subsequent set of data points;
   (e) determining a subsequent extraction region, the subsequent extraction region including a subset of the subsequent set of data points from which content is to be extracted;
   (f) extracting subsequent content from the subsequent extraction region and writing the subsequent content to the display frame; and
   wherein steps (e) to (f) are repeated for a period of time for a series of subsequent frames, and wherein the method further includes the step of removing the subsequent content associated with an earlier subsequent frame in the series of subsequent frames from the display frame.

2. The method of claim 1, wherein the method further includes the steps of:
   (b1) determining a corner location of two or more corners of the extraction region; and
   (e1) determining a subsequent corner location of two or more corners of the subsequent extraction region.

3. The method of claim 2, wherein the corner location of the two or more corners are determined by:
   (b1i) determining two or more edges of the extraction region;
   (b1ii) determining two or more locations at which two edges intersect, thereby determining the corner locations; and
   the two or more subsequent corner locations are determined by:
   (e1i) determining two or more edges of the subsequent extraction region;
   (e1ii) determining two or more locations at which two edges intersect, thereby determining the subsequent corner locations.

4. The method of claim 2, wherein steps (d) to (f) are repeated for a period of time for a series of subsequent frames, and wherein the method further includes the step of:
- (e2) determining a stabilized subsequent corner location by applying a Kalman filter to the subsequent corner locations of at least one of the subsequent corners in the series of subsequent frames and overwriting the subsequent corner location with the respective stabilized corner location.

5. The method of claim 2, wherein the method further includes the steps of:
- (b3) transforming the extraction region such that the corners of the extraction region are congruent with a normal projection of the physical writing surface; and
- (e3) transforming the subsequent extraction region such that the corners of the subsequent extraction region are congruent with the normal projection.

6. The method of claim 1, wherein the method further includes the steps of:
- (b4) determining an object region within the extraction region, the object region including a subset of the set of data points which do not relate to content to be extracted;
- (b5) removing the subset of data points in the object region from the subset of data points in the extraction region;
- (e4) determining a subsequent object region within the subsequent extraction region, the subsequent object region including a subset of the subsequent subset of data points which do not relate to content to be extracted; and
- (e5) removing the subsequent subset of data points in the object region from the subsequent subset of data points in the extraction region.

7. The method of claim 1, wherein the method further includes the steps of:
- (c1) during the step of extracting the content, altering the image data to remove the effects of one or more of:
  shadows on the physical writing surface;
  reflections on the physical writing surface; or
  lack of sharpness of the content; and
- (f1) during the step of extracting the subsequent content, altering the subsequent image data to remove the effects of one or more of:
  shadows on the physical writing surface;
  reflections on the physical writing surface; or
  lack of sharpness of the subsequent content.

8. The method of claim 7, wherein steps (e) to (f) are repeated for a period of time for a series of subsequent frames, and wherein the method further including the steps of:
- (f3) aligning the subsequent content with the content using an alignment vector determined by a registration algorithm;
- (g1) storing the alignment vector associated with each subsequent frame in the series of subsequent frames to form a series of alignment vectors;
- (g2) comparing the alignment vectors in the series of alignment vectors and determining whether a component of the alignment vectors is substantially similar in magnitude in the series of alignment vectors; and
- (g3) if the component is substantially similar in magnitude in the series of alignment vectors, transform the display frame by an inverse of the component.

9. The method of claim 8, wherein the subsequent content from an earlier subsequent frame to be removed in step (f3) only relates to the subsequent content that is not located in the subsequent object region of the most recent frame in the series of subsequent frames.

10. The method of claim 7, wherein the method is also suitable for extracting content from a further physical writing surface and write the content to a further display frame, the method further including the steps of:
- (f4) determining if an alignment vector of the series of alignment vectors fails to be determined and/or fails a quality control;
- (f5) determining a further alignment vector using the registration algorithm to align the subsequent content with the content written to the further display frame; and
- (f6) if the further alignment vector is determined and/or passes the quality control, writing the subsequent content to the further display frame.

11. The method of claim 10, wherein the method further includes the step of:
- (f7) displaying the further display frame on a display.

12. The method of claim 1, wherein the method further includes the step of:
- (f2) aligning the subsequent content with the content prior to writing the subsequent content to the display frame.

13. The method of claim 1, wherein the method further includes the steps of:
- (b1) determining a plurality of candidate extraction regions, each candidate extraction region including a subset of the set of data points from which content is to be extracted; and
- (b2) selecting the largest candidate extraction region of the plurality of candidate extraction regions as the extraction region.

14. The method of claim 1, wherein the method further includes the step of:
- (f9) displaying the display frame on a display, or projecting the display frame onto a second physical writing surface.

15. The method of claim 1, wherein the method is performed in alphabetical and/or numerical order of the steps as numbered.

16. The method of claim 1, wherein the method further includes the steps of determining whether a current image is similar to a previous image by generating a similarity score associated with the current image and the previous image, determining whether the generated similarity score is below a defined threshold, and upon a positive determination that the generated similarity score is below the defined threshold, saving the current image as a new image.

17. A non-transient computer-readable medium containing executable instructions for configuring a processor of a processing system to extract content from a physical writing surface, wherein execution of the executable instructions by the processor configures the processor to perform the steps of the method of claim 1.

18. One or more servers performing the method of claim 1.

19. A system for extracting content from a physical writing surface, the system including:
an electronic device; and
the one or more servers of claim 18.

* * * * *